3,175,008
PREPARATION OF QUATERNARY AMMONIUM
CHLORIDES
Sydney H. Shapiro, Chicago, and Thomas Michael
Chefalo, La Grange, Ill., assignors to Armour and
Company, Chicago, Ill., a corporation of Delaware
No Drawing. Filed Dec. 20, 1961, Ser. No. 160,911
6 Claims. (Cl. 260—567.6)

This invention relates to the preparation of quaternary ammonium compounds, and more particularly to an improved process for the production of quaternary ammonium chlorides.

The reaction for preparing quaternary ammonium chlorides from secondary amines involves the following reaction:

$$R_2NH + 2R'X \rightarrow R_2R_2'N^+X^- \cdot HX$$

As indicated by the above equation, one of the products of reaction is a hydrohalic acid. The acid can react with unreacted amine to form an amine salt, preventing further alkylation. Corrosion of equipment is another problem which arises as a result of the acid being present.

The above difficulties have been alleviated to some extent in prior processes by any one of several expedients.

The conventional practice has been to add a quantity of alkali, e.g. NaOH, in excess of the stoichiometric amount needed to neutralize all of the acid formed during the reaction. One disadvantage attendant to this process is the preclusion of the use of non-alkali resistant glass lined equipment which would be attacked by the strong alkali present. Further, the alkyl chloride tends to react preferentially with the inorganic base, resulting in the hydrolysis of the alkyl halide and the formation of metallic halide salts. In such a case excessive amounts of alkylating agent and inorganic base are required for the conversion of the amine to the quaternary and increases the possibility of salt contamination.

It has further been proposed to react one mole of the amine with more than one mole of an alkyl halide in the presence of a sufficient amount of sodium bicarbonate to neutralize the hydrohalic acid produced by the reaction as it is formed and maintain the reactants at a basic pH without promoting hydrolysis of the alkyl halide. While this process minimizes the amount of dissolved salt in the product, does away entirely with the use of strong alkalies, and results in good yields of a pure product, it possesses a disadvantage in that the reaction of the sodium bicarbonate wth the hydrohalic acid results in the formation of $CO_2$ and high pressure. If the gas is retained in the converter, high pressure equipment must be employed, and if the gas be vented, a complicated refrigerated methyl chloride recovery unit must be employed.

Other proposed processes employing sodium hydroxide with an alkylating agent have resulted in the formation of local concentrations of caustic which impart bad color and cause excessive hydrolysis of the methyl chloride, while at the same time as the amount of amine present diminishes, the alkyl halide often reacts with the alkali, resulting in hydrolysis and the formation of salt.

We have discovered that the above problems can be obviated and the disadvantages avoided by having about .5-10% of sodium bicarbonate (based on weight of the amine) at the beginning of the reaction as the stoichiometric additions of the alkali and chloride are made to the amine. We prefer to add about 1-3% of sodium bicarbonate.

A primary object, therefore, of the present invention is to provide a process which overcomes the disadvantages of the prior processes as outlined above, while at the same time producing high yields of a pure product. Yet another object is to provide a process whereby the time required for the reaction is very greatly reduced. A still further object is to provide a process in which sodium bicarbonate is employed to buffer the reaction medium so as to favor the alkylation reaction. Other specific objects and advantages will appear as the specification proceeds.

In one embodiment of the invention, the amine, alcohol and sodium bicarbonate are charged to a reactor and heated to a temperature of about 60–70° C., and the caustic and methyl chloride added at the stoichiometric ratio until the reaction is substantially complete and the free amine and amine chloride are preferably less than 2%. As the amine compounds, we can employ any secondary amines, including the secondary analogs of the aliphatic primary amines, such as dioctylamine, didecyl amine, diundecyl amine, didodecyl amine, ditetradecyl amine, dihexadecyl amine, dioctadecyl amine, dioctadecenyl amine, dioctadecadienyl amine, dioctatrienyl amine, and the statistical mixtures of the foregoing amines resulting from the hydrogenation of nitriles produced by the ammoniation of acids resulting from the hydrolysis of the mixed glycerides contained in vegetable and animal oils such as coconut oil, soybean oil, cottonseed oil, tallow, and the like. The preferred secondary amines are the mixtures described above. The secondary amine has two aliphatic hydrocarbon radicals containing from 8 to 18 carbon atoms.

We employ as a solvent for the amine and as a medium for the reaction, a low boiling alcohol, such as methanol, ethanol, propanol, isopropanol, butanol, isobutanol, or the like. The preferred alcohol is isopropyl alcohol.

As an alkylating agent, we prefer to employ methyl chloride. Methyl chloride is gaseous at room temperature and liquid under pressure, and thus is easily adapted to a liquid injection system.

With the methyl chloride, we prefer to add an alkaline material, such as sodium hydroxide which has high solubility at elevated temperatures and may be used as an aqueous solution. We prefer to employ 70% caustic or an aqueous solution of sodium hydroxide containing between about 70 and 72 weight percent. It will be understood, however, that aqueous concentrations as low as 50% can be employed, and, if desired, solid anhydrous sodium hydroxide may be used.

The process may be employed in any conventional equipment, and, if desired, in the type of equipment shown in Shapiro Patent No. 2,950,318.

In the preferred operation of the process, the amine compound, alcohol and sodium bicarbonate are charged to the reactor and the medium is heated to about 60–70° C. The caustic and methyl chloride are then added at the stoichiometric ratio to the charge during the reaction. The reaction is preferably continued until the free amine and amine hydrochloride are less than 2%. The product is then cooled and filtered.

By adding the sodium bicarbonate to the amine and low boiling alcohol at the beginning of the reaction and as the stoichiometric additions of the liquid alkali and alkyl halide are made, we find that the reaction time can be reduced substantially from an average of 6.6 hours to an average of 4 hours, and in some instances the reaction period has been brought into a range of 2 to 3 hours.

The following specific examples illustrate the saving in reaction time and other phases of the invention:

*Example I*

Charge:
- 10,800 pounds of Armeen 2C
- 282 gallons of isopropyl alcohol
- 370 gallons of methyl chloride
- 170 gallons of 70% caustic The amine and alcohol are charged to the vessel and the methyl chloride and caustic are added at the stoichiometric ratio to the mixture over a period of time until the free amine and amine hydrochloride are less than 2%. Reaction is conducted at 90° C. At the end of the reaction, the product is filtered and drummed. Reaction time for this run was 7.5 hours. Armeen 2C is a statistical mixture of secondary amines resulting from the hydrogenation of nitriles produced by the ammoniation of acid resulting from the hydrolysis of coconut oil and contains approximately 8% octyl, 9% decyl, 47% dodecyl, 18% tetradecyl, 8% hexadecyl, and 10% octadecyl radicals.

*Example II*

Charge:
- 11,300 pounds of Armeen 2HT
- 295 gallons of isopropanol
- 290 gallons of methyl chloride
- 90 gallons of 70% caustic The amine and alcohol are charged to the vessel and the methyl chloride and caustic added at the stoichiometric ratio until the free amine and amine hydrochloride are less than 2%. The reaction is run at 90–95° C. When the reaction is finished, the product is filtered and sent to storage. Reaction time for this run was 9.5 hours. Armeen 2HT is a statistical mixture of secondary amines resulting from the hydrogenation of nitriles produced by the ammoniation of acids resulting from the hydrolysis of tallow and contains approximately by weight 24% hexadecyl, 75% octadecyl, and 1% octadecenyl radicals.

*Example III*

Charge:
- 11,300 pounds of Armeen 2C
- 300 gallons of isopropanol
- 300 pounds of sodium bicarbonate
- 386 gallons of methyl chloride
- 114 gallons of 70% caustic The amine, alcohol, and the sodium bicarbonate are charged to the reactor. The reaction medium is heated to 60–70° C. and the caustic and methyl chloride added at the stoichiometric ratio to the charge until the free amine and amine hydrochloride are less than 2%. During this time, the reaction temperature reaches and is maintained at 90–95° C. When the reaction is finished, the product is cooled and filtered. The time for this run was 3¾ hours.

*Example IV*

Charge:
- 11,300 pounds of Armeen 2HT
- 300 gallons of isopropanol
- 300 gallons of methyl chloride
- 90 gallons of 70% caustic
- 300 pounds of sodium bicarbonate The amine and alcohol and sodium bicarbonate are charged to the vessel and heated to 60–70° C. The caustic and methyl chloride are then added at the stoichiometric ratio until the free amine and amine hydrochloride are less than 2%. During this time, the reaction temperature reaches and is maintained at 90–95° C. When the reaction is finished, the charge is cooled and filtered and sent to storage. The time for this run was 4 hours.

While in the foregoing specification, we have set out steps of the process in considerable detail for the purpose of illustrating embodiments of the invention, it will be understood that such detail of procedure may be varied widely by those skilled in the art without departing from the spirit of our invention.

We claim:

1. In a process for the production of tetraaliphatic ammonium chloride, the steps of: mixing an aliphatic secondary amine, sodium bicarbonate and an alkyl alcohol having from 1 to 4 carbon atoms, said sodium bicarbonate being present in the proportion of about 0.5 to 10% based upon the weight of the amine; reacting therewith, at a temperature of at least 60–70° C., caustic and methyl chloride which are added in stoichiometric ratio until the reaction is substantially complete.

2. The process of claim 1 wherein the said sodium bicarbonate is added in the proportion of about 1 to 3%.

3. The process of claim 1 wherein the said caustic is in an aqueous solution.

4. The process of claim 1 wherein the said caustic is sodium hydroxide.

5. The process of claim 1 wherein the said secondary amine has two aliphatic hydrocarbon radicals containing 8 to 18 carbon atoms.

6. The process of claim 1 wherein the said caustic and methyl chloride are added until the free amine and amine hydrochloride are less than 2%.

References Cited in the file of this patent

UNITED STATES PATENTS

| | | |
|---|---|---|
| 2,775,617 | Shapiro | Dec. 25, 1956 |
| 2,950,318 | Shapiro | Aug. 23, 1960 |